US009355660B2

(12) United States Patent
Lam et al.

(10) Patent No.: US 9,355,660 B2
(45) Date of Patent: May 31, 2016

(54) TESTING METHOD OF A MAGNETIC HEAD, AND TESTING APPARATUS THEREOF

(71) Applicant: SAE Magnetics (H.K.) Ltd., Hong Kong (CN)

(72) Inventors: Hokei Lam, Hong Kong (CN); Mankit Lee, Hong Kong (CN); Cheukman Lui, Hong Kong (CN); Wahchun Chan, Hong Kong (CN); Juren Ding, Hong Kong (CN); Rongkwang Ni, Hong Kong (CN); Cheukwing Leung, Hong Kong (CN); Wanyin Kwan, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 175 days.

(21) Appl. No.: 13/923,736

(22) Filed: Jun. 21, 2013

(65) Prior Publication Data

US 2014/0334279 A1    Nov. 13, 2014

(30) Foreign Application Priority Data

May 9, 2013   (CN) .......................... 2013 1 0169758

(51) Int. Cl.
*G01R 33/12*     (2006.01)
*G11B 5/455*     (2006.01)

(52) U.S. Cl.
CPC ..................................... *G11B 5/455* (2013.01)

(58) Field of Classification Search
CPC ........... G11B 5/455; G11B 2005/0016; G11B 5/012; G11B 5/3166; G01R 19/0053; G01R 33/00; G01R 33/02; G01R 15/20; B82Y 25/00
USPC ........................................ 324/210; 369/53.38
See application file for complete search history.

(56) References Cited

U.S. PATENT DOCUMENTS

| | | | |
|---|---|---|---|
| 2008/0049351 A1* | 2/2008 | Yamanaka et al. | 360/59 |
| 2010/0002327 A1* | 1/2010 | Call et al. | 360/31 |
| 2012/0275047 A1* | 11/2012 | Lui et al. | 360/31 |
| 2013/0204590 A1* | 8/2013 | Lam et al. | 703/2 |

* cited by examiner

*Primary Examiner* — Son Le
*Assistant Examiner* — Brent J Andrews
(74) *Attorney, Agent, or Firm* — Nixon & Vanderhye, P.C.

(57) ABSTRACT

A testing method of a magnetic head includes: applying a first magnetic field with a constant intensity in a first direction that is the same with that of the longitudinal bias field to the magnetic head, simultaneously applying a second magnetic field with variant intensities in a second direction traversing the air bearing surface, and measuring a first noise; applying a third magnetic field with a constant intensity in a third direction that is opposite to the first direction to the magnetic head, simultaneously applying the second magnetic field with variant intensities in the second direction, and measuring a second noise; and analyzing noise change between the first noise and the second noise. The invention can screen out defective magnetic heads that possess poor noise characteristic and unstable performance.

12 Claims, 7 Drawing Sheets

TESTING METHOD OF A MAGNETIC HEAD, AND TESTING APPARATUS THEREOF

This application claims priority to Chinese application Ser. No. 201310169758.3 filed May 9, 2013, the entire contents of which is hereby incorporated by reference.

FIELD OF THE INVENTION

The present invention relates to a method of testing the performance of a magnetic head and, more particularly to a noise testing method of a magnetic head to detect the defective magnetic head, and a noise testing apparatus using the same.

BACKGROUND OF THE INVENTION

As hard disk drive apparatuses increase in capacity and reduce in size, highly sensitive and high-resolution thin-film magnetic heads are being demanded. In order to satisfy the demand, giant magentoresistive effect (GMR) thin-film magnetic heads with GMR read head elements each having a multi-layered structure with a magnetization-fixed layer and a magnetization-free layer become widely used. On the other hand, tunnel magnetoresistive effect (TMR) thin-film magnetic heads with TMR read head elements having higher sensitivity and higher resolution are put to practical use.

Nowadays, the magnetoresistive (MR) read heads are widely used in a popular magnetic head because an MR element with higher sensitivity is included therein. A plurality of performance of a magnetic head must be tested before the magnetic head is used, which includes dynamic flying height (DFH) performance, Signal-to-Noise Ratio (SNR) performance, reliability, stability and the like. Specially, as the noise is generated, the performance of the magnetic head is weakened, for example, the flying height of the magnetic head is unstable and hard to control, which cause the stability is reduced and, in turn, the reading performance is weakened.

Thus, a noise testing process must be carried out before the magnetic head product is put into use. One of common methods for determining whether a magnetic head is acceptable or defective by measuring noise generated in response to an external magnetic field. And noise profile can be obtained and a noise level of the magnetic head can be measured out, in turn, an acceptable or defective magnetic head can be estimated and judged.

The following method has been used as a conventional method of testing an MR read head by applying an external magnetic field with a direction the same with that of a longitudinal bias field. As shown in FIG. 1a, the MR read head 10 includes two hard magnets 112, an MR element 114 sandwiched between the two hard magnets 112, and two shielding layers 116 disposed on both sides of the MR element 114 and the hard magnets 112. As shown in FIG. 1b, the MR element 114 includes a first ferromagnetic layer 121, a second ferromagnetic layer 122 and an anti-ferromagnetic (AFM) layer 123 which is formed in physical contact with the second ferromagnetic layer 122 to provide exchange bias magnetic field by exchange coupling at the interface of the layers. The magnetization direction in the second ferromagnetic layer 122 is constrained or maintained by the exchange coupling, thus the second ferromagnetic layer 122 is also called "pinned layer" 122. In general, the magnetization direction of the first ferromagnetic layer 121 is controlled by longitudinal bias magnetic field which is produced by the hard magnets 112. When an external magnetic field applied onto the MR read head is strong enough to compensate the longitudinal bias magnetic field, the magnetization direction of the first ferromagnetic layer 121 is free to rotate in response to the external applied magnetic field, thus the first ferromagnetic layer 121 is also called "free layer" 121. The direction of the magnetization in the free layer 121 changes between parallel and anti-parallel against the direction of the magnetization in the pinned layer 122, and hence the characteristics are obtained.

In MR read head, strength and intensity of the longitudinal bias field will impact noise generated by fluctuations or displacements of the magnetic domain boundaries. If the longitudinal bias field applied to the free layer is small, noise will be easily occurred; if the longitudinal bias field is large, the change in the magnetization direction of the free layer becomes difficult causing the sensing sensitivity of MR read head to be degraded. Thus a testing magnetic field with the same direction of the longitudinal bias field is hard to control, and the testing accuracy resulted by this testing method is low and the efficiency is low.

Hence, it is desired to provide an improved testing method of a magnetic head and a testing apparatus thereof, to overcome the above-mentioned drawbacks.

SUMMARY OF THE INVENTION

One objective of the present invention is to provide a testing method of a magnetic head, which can screen out defective magnetic heads that possess poor noise characteristic and unstable performance.

Another objective of the present invention is to provide a testing apparatus of a magnetic head, which can screen out defective magnetic heads that possess poor noise characteristic and unstable performance.

To achieve the above objectives, a testing method of a magnetic head of the present invention includes steps of: (a) applying a first magnetic field with a constant intensity in a first direction that is the same with that of the longitudinal bias field to the magnetic head, simultaneously applying a second magnetic field with variant intensities in a second direction traversing the air bearing surface, and measuring a first noise; (b) applying a third magnetic field with a constant intensity in a third direction that is opposite to the first direction to the magnetic head, simultaneously applying the second magnetic field with variant intensities in the second direction, and measuring a second noise; and (c) analyzing noise change between the first noise and the second noise.

As a preferred embodiment, the step (a) further includes repeating applying the first magnetic field with different constant intensities, and simultaneously applying the second magnetic field with variant intensities to measure the first noise; and the step (b) further includes repeating applying the third magnetic field with different constant intensities, and simultaneously applying the second magnetic field with variant intensities to measure the second noise.

Preferably, the step (c) further comprises the noise change is calculated by the relationship: Delta Noise=(the first noise/the second noise−1)*100%.

As another preferred embodiment, the constant intensity of the third magnetic field is smaller than that of the intrinsic longitudinal bias field provided by the hard magnets.

As more one preferred embodiment, an angle is formed between the second direction and the air bearing surface.

Preferably, the second direction is perpendicular to the air bearing surface.

Preferably, the second direction goes in the air bearing surface or goes out from the air bearing surface.

Accordingly, a testing apparatus of a magnetic head of the present invention includes a first magnetic field applying unit arranged for applying a first magnetic field with a constant intensity in a first direction that is the same with that of the longitudinal bias field or a third magnetic field with a constant intensity in a third direction opposite to the first direction to the magnetic head; a second magnetic field applying unit arranged for applying a second magnetic field with variant intensities in a second direction traversing the air bearing surface; a measuring unit connecting with the magnetic head to measure a first noise according to the first and the second magnetic fields or a second noise according to the third and the second magnetic fields; and an analyzing unit connecting with the measuring unit to analyzing noise change between the first noise and the second noise.

Preferably, the noise change is calculated by the relationship: Delta Noise=(the first noise/the second noise−1)*100%.

As one preferred embodiment, an angle is formed between the second direction and the air bearing surface.

Preferably, the second direction is perpendicular to the air bearing surface.

Preferably, the second direction goes in the air bearing surface or goes out from the air bearing surface.

In comparison with the prior art, the present invention measures out different noise level by applying a first magnetic field with a constant intensity in a first direction that is the same with that of the longitudinal bias field and a third magnetic field in a third direction that is opposite to the first direction, and then analyzing the noise change between the noises measured by the two ways. Thus defective magnetic head with poor noise characteristic and unstable performance may be detected and screened out by analyzing the noise change, such as a significant change of noise may occur in the testing profile at a certain external magnetic field applied. Meanwhile, the testing result of the present invention by quasi-static testing method is accordant with that tested by dynamic testing method, which indicates the testing method of the present invention is accurate and efficient.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a schematic diagram of an MR element shown in FIG. 1a;

FIG. 2b is a perspective view of an MR read sensor of the magnetic head shown in. FIG. 2a;

DETAILED DESCRIPTION OF ILLUSTRATED EMBODIMENTS

Figure 1A:
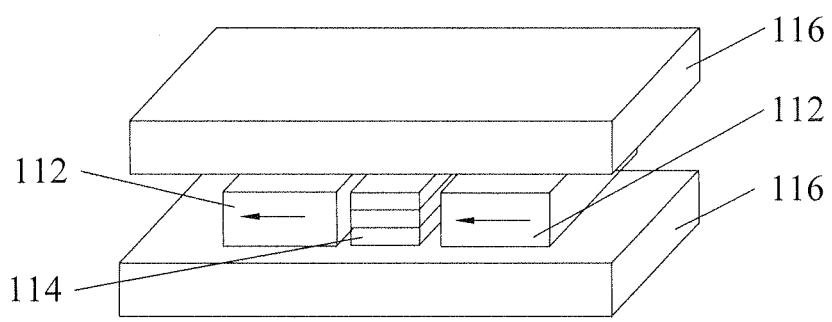
FIG. 1a is a simplified and partial perspective view of a conventional MR read head.
Figure 1B:
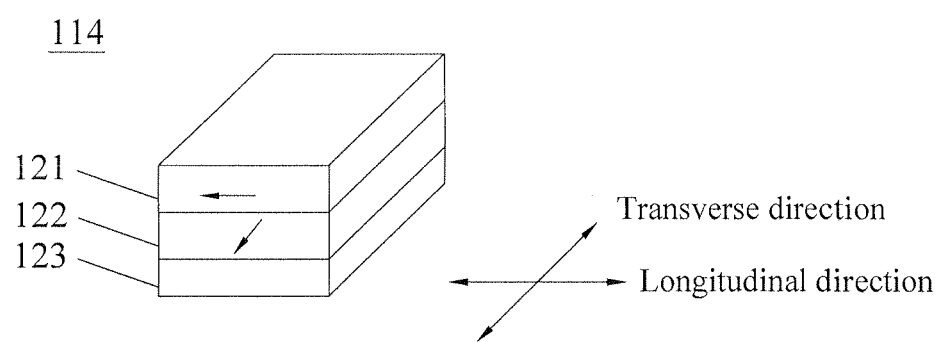

Various preferred embodiments of the invention will now be described with reference to the figures, wherein like reference numerals designate similar parts throughout the various views. As indicated above, the invention is directed to a testing method and a testing apparatus of a magnetic head, which can screen out defective magnetic heads that possess poor noise characteristic and unstable performance.

Figure 2A:
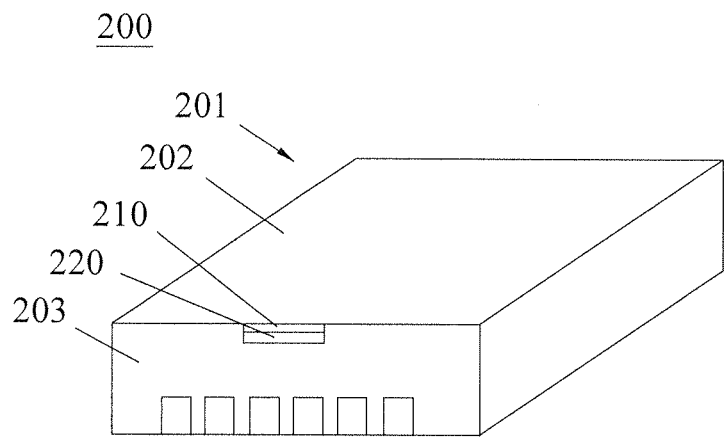
FIG. 2a is a simplified schematic diagram of a magnetic head according to the present invention.
Figure 2B:
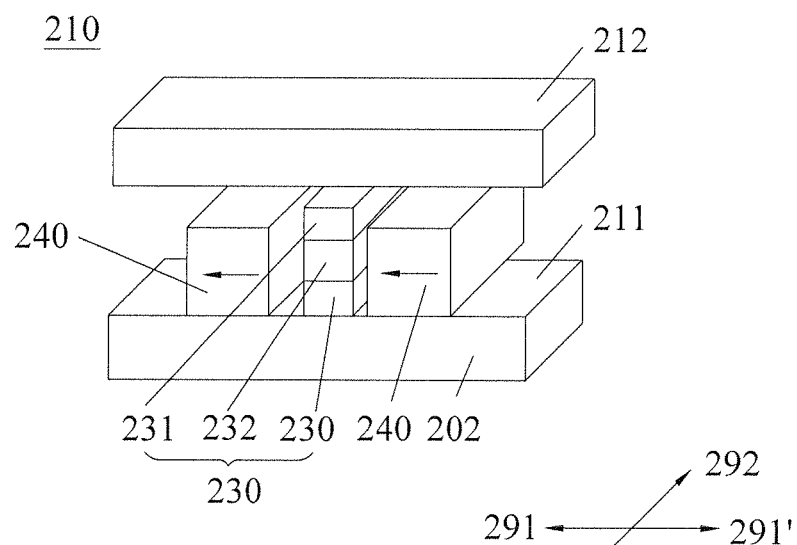

FIG. 2a is a simplified schematic diagram of a magnetic head according to the present invention. As shown, the magnetic head 200 includes a substrate body 201, an ABS 202 and a bottom surface (not shown) opposite to the ABS 202, a leading edge 203 and a trailing edge (not shown) opposite each other. The ABS 202 is processed so as to an appropriate flying height. An MR read head 210 and a write head 220 are provided on the leading edge 203. Specifically, as shown in FIG. 2b, the MR read head 210 includes a first shielding layer 211 formed on a substrate (not shown), a second shielding layer 212, and an MR element 230 sandwiched between the first and second shielding layers 211, 212. Therein, a pair of hard magnet 240 is sandwiched therebetween as well and respectively placed on two sides of the MR element 230. The MR element 230 includes a free layer 231, a pinned layer 232 and an AFM layer 233. In general, the magnetization direction of the free layer 231 is controlled by longitudinal bias magnetic field which is produced by the hard magnets 240. When an external magnetic field applied onto the MR element 230 is strong enough to compensate the longitudinal bias magnetic field, the magnetization direction of the free layer 231 is free to rotate in response to the external applied magnetic field. The direction of the magnetization in the free layer 231 will change between parallel and anti-parallel against the direction of the magnetization in the pinned layer 232.

Specifically in a certain MR element, the longitudinal bias field is in a direction illustrated as 291 or its opposite direction 291', and the intensity of the longitudinal bias field provided by the hard magnets 240 is constant, commonly in a range of several hundreds to several thousands Oe which is not limited. In the present invention, the direction of the longitudinal bias field is illustrated as arrow 291 and the opposite direction is illustrated as arrow 291'in FIG. 2b.

In the testing method of the present invention, the first direction of the first magnetic field applied to the magnetic head 200 is the same with that of the longitudinal bias field, namely the arrow 291. The third direction of the third magnetic field is opposite to that of the longitudinal bias field, namely the arrow 291'. Selectively, the intensity of the first magnetic field and the third magnetic field is selected from several hundreds to several thousands Oe which is not limited.

Simultaneously, the second magnetic field is applied to the magnetic head 200 to perform the testing process, wherein the second magnetic field is in a second direction traversing the ABS 202. Alternatively, the second direction can go in the ABS 202 or go out from the ABS 202. Preferably, in the present embodiment, the second direction goes in the ABS 202 and at 90° to the ABS 202 (perpendicular to the ABS 202), which is illustrated as arrow 292. Optionally, an acute angle formed between the second direction and the ABS 202 also can be selected, which is not limited.

Figure 3:
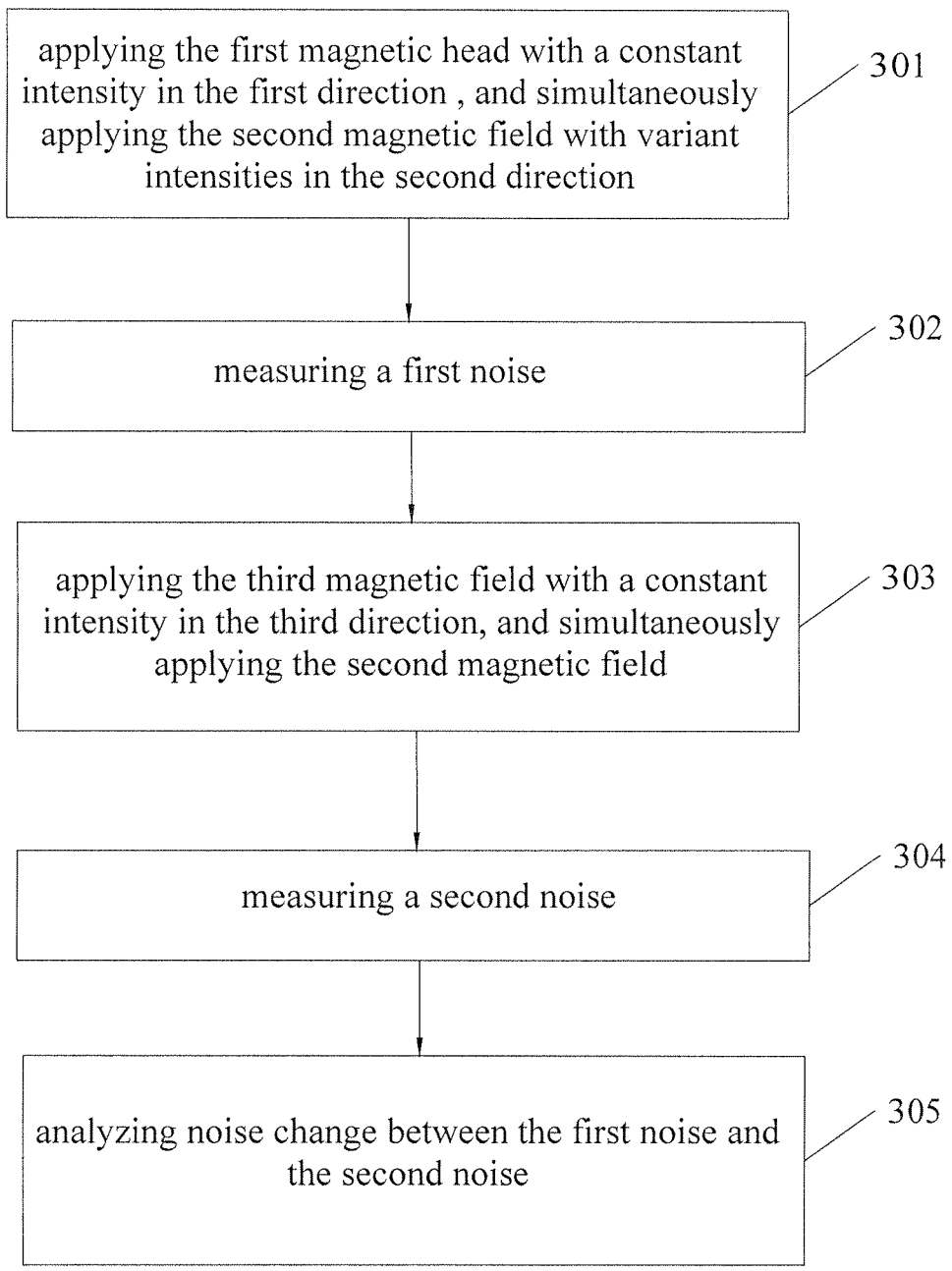
FIG. 3 is a flowchart of a testing method of a magnetic head according to one embodiment of the present invention.

FIG. 3 is a flowchart of a testing method of a magnetic head 200 according to one embodiment of the present invention. The method includes following steps of:

301, applying the first magnetic head with a constant intensity in the first direction 291, and simultaneously applying the second magnetic field with variant intensities in the second direction 292.

302, measuring a first noise;

303, applying the third magnetic field with a constant intensity in the third direction 291', and simultaneously applying the second magnetic field;

304, measuring a second noise;

305, analyzing noise change between the first noise and the second noise.

Preferably, the intensity of the third magnetic field is closed to but not equal or larger than that of the intrinsic longitudinal bias field provided by the hard magnets 240, in the status of the intensity of the intrinsic longitudinal bias field is known by the operator, due to the overlarge intensity of the third magnetic field with an opposite direction to that of the intrinsic longitudinal bias field may collapse the magnetic head, which causes the testing meaningless. Since the intensity of the third magnetic field applied is closed to the intrinsic longitudinal bias field, thus an obvious and sensitive noise character appears when the third magnetic field and the second magnetic field are applied.

As an improved embodiment, when the intensity of the intrinsic longitudinal bias field is unknown by the operator, the step 301 in the testing method of the first embodiment further includes the following steps: repeating applying the first magnetic field with different constant intensities, and simultaneously applying the second magnetic field with variant intensities to measure the first noise. And the step 303 further includes repeating applying the third magnetic field with different constant intensities, and applying simultaneously the second magnetic field with variant intensities to measure the second noise. Specifically, the applying of the first and the third magnetic field is set to repeat multiple times with a certain density. The time consumed and the testing accuracy of the testing process is depended on the repeating times and the testing density.

Figure 4:
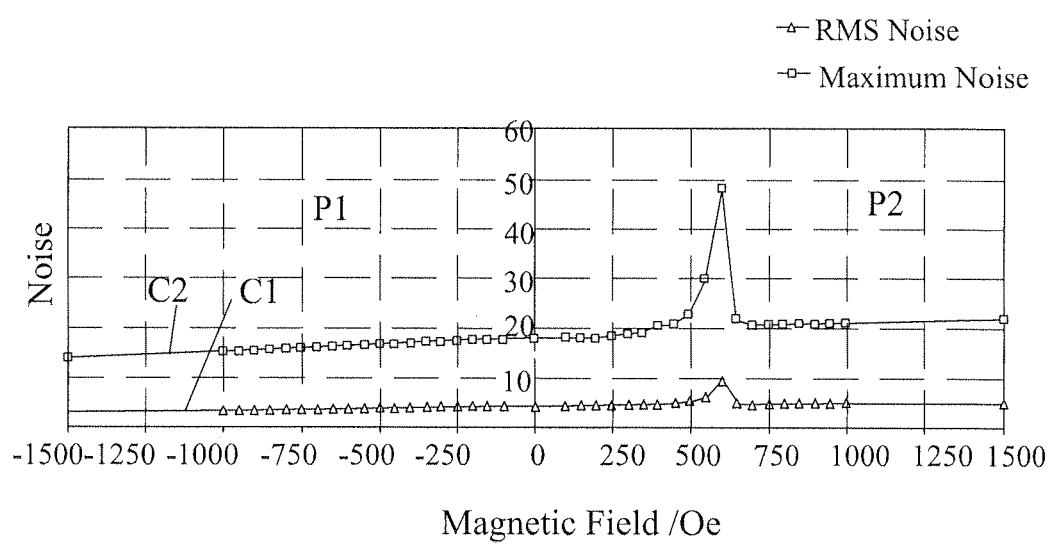
FIG. 4 is a graph of a practical example, which shows the first and second noise curves tested by applying the first magnetic field in the first direction according with the longitudinal bias field and the third magnetic field with in the second direction opposite to the longitudinal bias field.

FIG. 4 shows a graph of a practical example, which shows the first and second noise curves tested by applying from the first magnetic field in the first direction 291 to the third magnetic field in the opposite direction 291', and with the second magnetic field applied simultaneously. Specifically, the experimented magnetic head appears even RMS (root mean square) of noise (curve C1) and maximum value of noise (curve C2) when the first magnetic field in the first direction 291 (namely the longitudinal bias field direction) and the second magnetic field are applied (292), which is illustrated as the first noise curve profile P1 (the left profile), while the experimented magnetic head appears higher noise amplitude raised obviously in a certain intensity of the third magnetic field in the second direction 291' (namely the direction opposite the longitudinal bias field direction), which appears in the second noise curve profile P2 (the right profile). From these noise curves P1 and P2, the noise change between the first and second noises can be calculated by the following relationship: Delta Noise=(the first noise/the second noise−1)*100%. The Delta Noise calculated is referenced to evaluate the noise level or noise characteristic of the tested magnetic head. If the Delta Noise is larger than a certain threshold, the tested magnetic head is judged as a defective magnetic head, which is needed to repaired and improved or abandoned.

Please notice that, the methods of measuring noise are not limited, familiar measuring methods can be used. As the noise measuring methods are familiar and known by the peoples ordinarily skilled in the art, thus detailed description is omitted here.

Following descriptions relates to contrast of the testing result between the common dynamic testing method and the testing method of the present invention.

Figure 5:
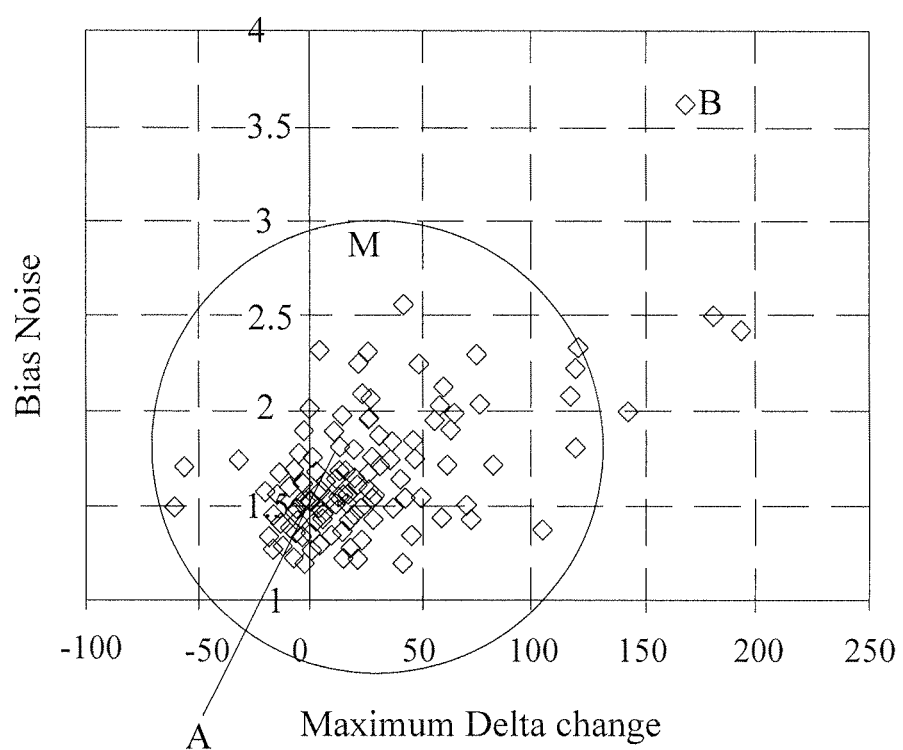
FIG. 5 is a noise testing result of a great number of experimented magnetic heads tested by dynamic testing method.

FIG. 5 is a noise testing result of a great number of experimented magnetic heads tested by dynamic testing method. Each point in the FIG. 5 denotes one testing magnetic head. The points collected in the area denoted by a circle M are shown as the better magnetic heads which oppose good noise characteristic, such as the point A, while the points far away the circle M are shown as the poor magnetic heads having poor noise characteristic, such as the point B.

Figure 5A:
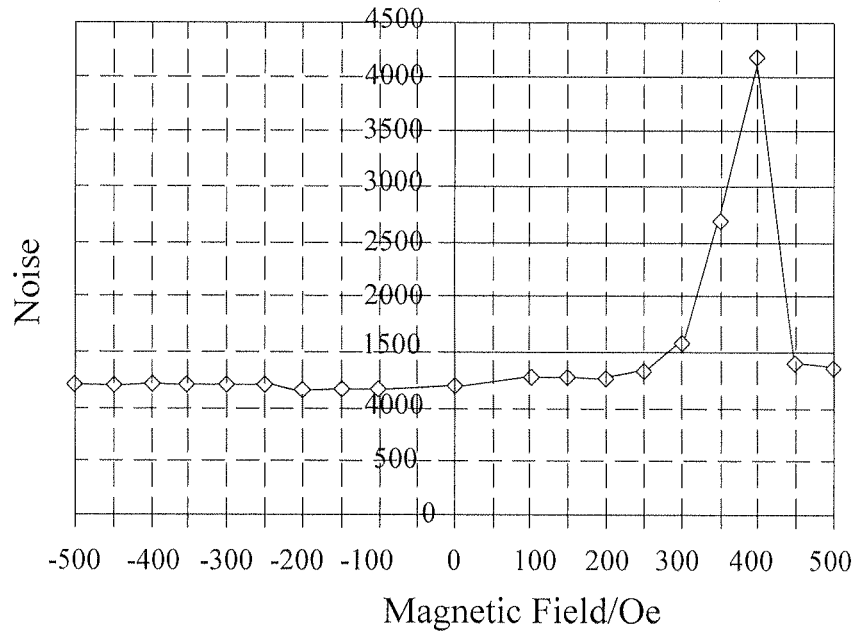
FIG. 5a is a testing result of a poor magnetic heads selected from the experimented magnetic head shown in FIG. 5 tested by the testing method according to the present invention.
Figure 5B:
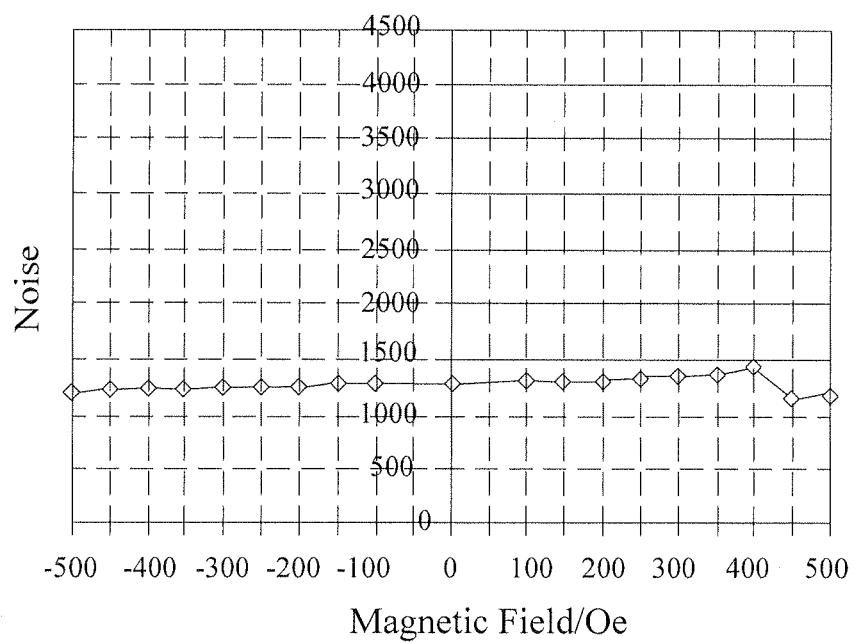
FIG. 5b is a testing result of a good magnetic heads selected from the experimented magnetic head shown in FIG. 5 tested by the testing method according to the present invention.

And then, the magnetic heads A and B is selected as an example to test. FIG. 5a is a testing result of the poor magnetic head B selected from the experimented magnetic head shown in FIG. 5 tested by the testing method according to the present invention. FIG. 5b is a testing result of the good magnetic head A selected from the experimented magnetic head shown in FIG. 5 tested by the testing method according to the present invention. It can be seen from FIG. 5a, a high noise peak appears in a certain intensity of the third magnetic field (opposite the longitudinal bias field direction), but no high noise peak appears in the corresponding intensity of the first magnetic field (the longitudinal bias field direction). Thus, a Delta Noise calculated is very high and higher than the certain threshold greatly. Contrarily, a noise characteristic of the magnetic head A is good, and its Delta Noise calculated is low. By this token, the testing results between the common dynamic testing method and the testing method of the present invention are accordant, which substantiates the testing accuracy of testing method of the present invention.

In conclusion, the present invention measures out different noise level by applying the first magnetic field with a constant intensity in the first direction 291 (the longitudinal bias field direction) and a third magnetic field in the third direction 291' that is opposite to the first direction 291, and then analyzing the noise change between the noise measured by the two ways. Thus defective magnetic head with poor noise characteristic and unstable performance may be detected and screened out by analyzing the noise change, such as a significant change of noise may occur in the testing profile at a certain external magnetic field (namely the second magnetic field) applied. Meanwhile, the testing result of the present invention by quasi-static testing method is accordant with that tested by the common dynamic testing method, which indicates the testing method of the present invention is accurate and efficient.

Figure 6:
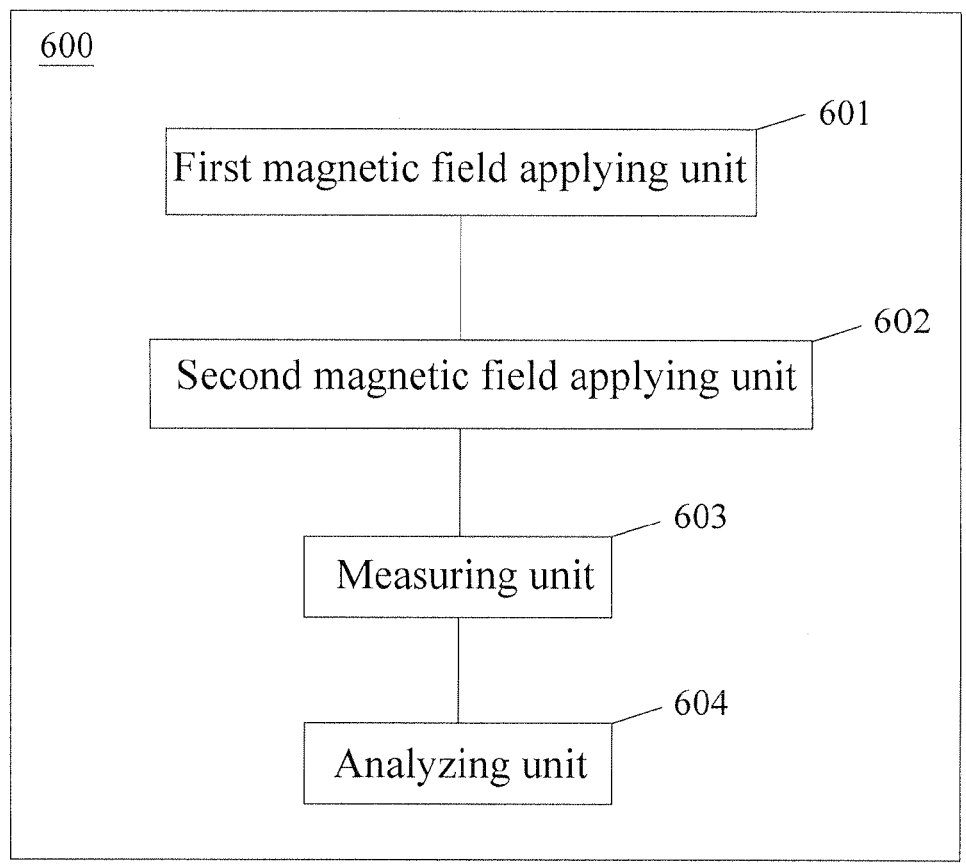
FIG. 6 shows a testing apparatus of a magnetic head according to one embodiment of the present invention.

Accordingly, FIG. 6 shows a testing apparatus of a magnetic head according to one embodiment of the present invention. The testing apparatus 600 includes a first magnetic field applying unit 601, a second magnetic field applying unit 602, a measuring unit 603, and an analyzing unit 604.

Concretely, the first magnetic field applying unit 601 is arranged for applying a first magnetic field with a constant intensity in a first direction that is the same with that of the longitudinal bias field or a third magnetic field with a constant intensity in a third direction opposite to the first direction to the magnetic head. The second magnetic field applying unit 602 is arranged for applying a second magnetic field with variant intensities in a second direction traversing the ABS. The measuring unit 603 is connected with the magnetic head to measure a first noise according to the first and the second magnetic fields or a second noise according to the third and the second magnetic fields. The analyzing unit 604 is connected with the measuring unit 603 to analyzing noise change between the first noise and the second noise.

Please notice that, the testing apparatus 600 performs the testing method described above, and provides the corresponding operation condition. If necessary, the apparatus 600 can include all of the function units according to the testing method, which is omitted herein.

By using the testing apparatus 600, defective magnetic heads with poor noise characteristic and unstable performance may be detected and screened out by analyzing the noise change. Meanwhile, the testing result of the present invention by testing apparatus 600 is accordant with that tested by the common dynamic testing apparatus, which indicates the testing apparatus of the present invention is accurate and efficient.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A testing method of a magnetic head, the magnetic head including a pair of hard magnets providing a longitudinal bias field and an air bearing surface, and the testing method comprising:
    (a) applying a first magnetic field with a constant intensity in a first direction that is the same with that of the longitudinal bias field to the magnetic head, simultaneously applying a second magnetic field with variant intensities in a second direction traversing the air bearing surface, and measuring a first noise which is generated in response to externally applied magnetic fields;
    (b) applying a third magnetic field with a constant intensity in a third direction that is opposite to the first direction to the magnetic head, simultaneously applying the second magnetic field with variant intensities in the second direction, and measuring a second noise which is generated in response to externally applied magnetic fields; and
    (c) analyzing a delta noise between the first noise and the second noise.

2. The testing method according to claim 1, wherein (a) further comprises repeatedly applying the first magnetic field with different constant intensities, and simultaneously applying the second magnetic field with variant intensities to measure the first noise; and (b) further comprises repeatedly applying the third magnetic field with different constant intensities, and simultaneously applying the second magnetic field with variant intensities to measure the second noise.

3. The testing method according to claim 1, wherein (c) further comprises the delta noise is calculated by the relationship: Delta Noise =(the first noise/the second noise −1) *100%.

4. The testing method according to claim 1, wherein the constant intensity of the third magnetic field is smaller than that of the intrinsic longitudinal bias field provided by the hard magnets.

5. The testing method according to claim 1, wherein an angle is formed between the second direction and the air bearing surface.

6. The testing method according to claim 5, wherein the second direction is perpendicular to the air bearing surface.

7. The testing method according to claim 5, wherein the second direction goes in the air bearing surface or goes out from the air bearing surface.

8. A testing apparatus of a magnetic head, the magnetic head including a pair of hard magnets providing a longitudinal bias field and an air bearing surface and the testing apparatus comprising:
    a first magnetic field applicator arranged for applying a first magnetic field with a constant intensity in a first direction that is the same with that of the longitudinal bias field or a third magnetic field with a constant intensity in a third direction opposite to the first direction to the magnetic head;
    a second magnetic field applicator arranged for applying a second magnetic field with variant intensities in a second direction traversing the air bearing surface;
    a measurer connecting with the magnetic head configured to measure a first noise according to the first and the second magnetic fields or a second noise according to the third and the second magnetic fields; and
    an analyzer connecting with the measurer configured to analyze a delta noise between the first noise and the second noise.

9. The testing apparatus according to claim 8, wherein the delta noise is calculated by the relationship: Delta Noise=(the first noise/the second noise −1) *100%.

10. The testing apparatus according to claim 8, wherein an angle is formed between the second direction and the air bearing surface.

11. The testing apparatus according to claim 10, wherein the second direction is perpendicular to the air bearing surface.

12. The testing apparatus according to claim 10, wherein the second direction goes in the air bearing surface or goes out from the air bearing surface.

* * * * *